UNITED STATES PATENT OFFICE 2,394,565

PHYSIOLOGICALLY ACTIVE COMPOUNDS AND A METHOD OF MAKING THE SAME

Arthur Serini, Berlin N. 65, and Konrad Steinruck, Berlin-Tegel, Germany, assignors to Schering Corporation, Bloomfield, N. J., a corporation of New Jersey No Drawing. Application August 6, 1938, Serial No. 223,530. In Germany August 7, 1937

13 Claims. (Cl. 260—479)

This invention relates to physiologically active compounds and more particularly to compounds possessing an oestrogenic activity, and a method of making the same.

It is already known that "synthetic oestrogenic compounds" can be made in a rather complicated manner by synthesizing phenanthrene derivatives; compare, for instance Cook and Dodds in Oppenheimer, Handbuch der Biochemie der Menschen und Tiere 2 edition, volume 3, pages 774-775 (1936). It is furthermore known that polymerisation products of unsaturated phenols, for instance, of p-propenylphenol possess a certain oestrogenic activity; compare, for instance, Dodds and Lawson Nature 1937, number 3519 page 627 and number 3529, page 1068. The activity of these compounds, however, as has been found by experiment, is so low, namely 100 mg. for 1 rat unit, that these products cannot be employed therapeutically.

Now, it has been found that new products of a considerably higher oestrogenic activity are obtained by subjecting propenylphenols, especially p-propenylphenol, or propenylphenols in statu nascendi, as obtained, for instance, by saponification of their ethers such as anethol by means of Grignard reagent, to the action of metalloorganic compounds, especially of alkyl magnesium halides and isolating from the reaction mixture the oestrogenic compounds. A further increase of the activity of compounds obtained in this manner or by any other method is caused by esterifying the same. The best purification of the esters is achieved on fractionally distilling the esterified product, preferably in a high vacuum. As alkyl magnesium halides those with various alkyl radicals may be employed. Ethyl magnesium halide, however, has proved to be the best means yielding the most active products. As stated above in connection with the purification of the esters, the separation of the oestrogenic compounds from inactive reaction products is preferably carried out by fractional distillation in a high vacuum. However, other chemical or physical purification methods, for instance, fractional crystallisation, sublimation and the like may be used likewise.

The constitution of the new compounds is not yet known. Most probably polymerisation takes place. It is, however, also possible that besides polymerisation of two mols of the propenylphenols at the same time an addition of one or two alkyl groups at the double bond of the propylene residue may occur. Hence, the constitution of the new compounds may be given as follows:

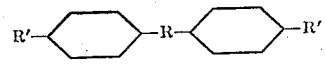

wherein R represents an alkyl group with more than five C-atoms, especially with more than seven C-atoms, while R' represents a hydroxyl group or an ester group.

The invention may be illustrated by the following examples without, however, limiting the same to them.

Example 1

To a Grignard solution made from 2.5 g. of magnesium, 100 ccs. of ether and 17.5 g. of ethyl iodide, there are added 15 g. of propenyl-phenol dissolved in a little ether. After heating for 1 hour on the water bath the ether is distilled off from the mixture in an oil bath whereafter the temperature is increased for 1 hour to 160° C. The residue is then decomposed by means of ice while adding 3 n. sulphuric acid, extracted with ether, the ether is distilled off, and the remaining product distilled in a high vacuum at 140°-160° C. and 0.001 mm. The product distilled over, about 8 g., represents a viscous dark-coloured oil having an activity of 2500 γ for 1 rat unit. On repeated fractional distillation in a high vacuum a fraction is obtained boiling between 140-150° C. at 0.001 mm. that yields on solidifying about 60 mg. of a glassy product having an activity of 30 γ for 1 rat unit.

These 60 mg. are heated with 1.5 cc. of acetic acid anhydride for several hours under reflux whereupon the acetic acid anhydride is distilled off in a vacuum. The remaining viscous oil is then distilled in a high vacuum between 150-170° C. at 0.001 mm. The distillate is dissolved in a little methanol and the solution is cooled to —20° C. Thereby small crystals separate having a melting point of 186° C. the activity of which on subcutaneous application is found at 5-10γ and or peroral application at 40γ for 1 rat unit. Such a compound in contrast to the known follicle hormone shows an excellent peroral activity; for, the follicle hormone has only a peroral activity of 75γ.

Example 2

A Grignard solution is made from 2.43 g. of magnesium and 15.6 g. of ethyl iodide in 100 cc. of absolute ether. Thereupon the ether is distilled off whereby the temperature is increased to 130° C. Then 15.7 g. of anethol are added at once and the reaction solution is heated up to 150-160° C. Thereby the reaction mixture foams due to the development of gas and finally solidifies.

It is then decomposed by means of ice and dilute sulphuric acid. The viscous oil obtained thereby is extracted with ether and the ether solution shaken with dilute sodium hydroxide solution in order to remove the phenolic products. On acidifying the alkaline solution phenolic products are liberated and extracted with ether. After distilling off the ether the residue is rectified in a high vacuum. The amount distilling over between 110°–120° C. that represents mostly p-propenyl phenol is separated and the product distilling over between 120°–180° C. at 0.001 mm. is again distilled in a high vacuum. The fraction distilling over between 140°–150° C. at 0.001 mm. yields on solidification the same glassy product as is obtained according to Example 1. On acetylation an acetate compound is obtained having a melting point of 186° C. and the same physiological activity as the acetate compound of Example 1.

Example 3

A Grignard solution is made from 2.43 g. of magnesium and 17 g. of propyl iodide in 100 cc. of absolute ether. After distilling off the ether whereby the temperature is increased to 130° C., 15.7 g. of anethol are added at once to the residue, whereupon the reaction mixture is heated up to 150°–160° C. Foaming takes place due to the development of gas. The solidified reaction mixture is then decomposed by the addition of ice and dilute sulphuric acid. The separated viscous oil is extracted with ether and the phenolic products are removed from the ethereal solution by shaking the same with dilute sodium hydroxide solution. The alkaline solution is then acidified and extracted with ether. 9.3 g. of the residue obtained after distilling off the ether are purified by rectification in a high vacuum. The portion distilling over between 110°–120° C. and consisting mostly of p-propenyl phenol is separated, and the 4.5 g. of the portion distilling between 150–200° C. at 0.001 mm. are again distilled in a high vacuum. The fraction distilling between 150°–170° C. at 0.001 mm. forms after solidification a similar glass-like product to that obtained according to Example 1. On acetylation and high vacuum distillation at 0.001 mm. a main fraction is obtained distilling over between 160°–180° C. Upon triturating the same with a little methanol and cooling the solution to a low temperature, small white needles are obtained having a melting point of 175° C. Their physiological activity amounts to 5–10 γ for 1 rat unit.

Example 4

The procedure is the same as described in Example 3 except that instead of propyl iodide, methyl iodide is used. The distillate obtained on high vacuum distillation between 180°–200° C. at 0.001 mm. shows an activity of 200 γ for 1 rat unit.

On acetylation and further high vacuum distillation a physiologically highly active acetate is obtained from said phenolic compound.

Example 5

The procedure is the same as described in Example 4.

On benzoylation and high vacuum distillation a benzoate is obtained having a high physiological activity.

Example 6

A Grignard solution is made from 4.85 g. of magnesium and 33 g. of ethyl iodide in 200 cc. of absolute ether. After distilling off the ether whereby the temperature is increased up to 130° C., 10 g. of iso-eugenol methyl ether are added at once to the residue. The reaction mixture is then heated whereby it foams considerably at 142°–148° C. due to gas formation. After solidification of the reaction mixture it is decomposed by the addition of ice and of dilute sulphuric acid. The viscous oil separated thereby is extracted with ether. From the ethereal solution the phenolic components are removed by shaking with dilute sodium hydroxide solution. The alkaline solution is then acidfied and extracted with ether. After distilling off the ether the residue is rectified in a high vacuum. The fraction distilling over at 220° C. and 0.001 mm. contains a rat unit in 200 γ.

On acetylation and further high vacuum distillation a physiologically highly active acetate is obtained therefrom.

Example 7

The procedure is the same as described in Example 6 with the exception that in the place of ethyl iodide, methyl iodide is used and in the place of iso-eugenol methyl ether 20 g. of butenyl anisol are used. The distillate obtained at 220° C. and 0.001 mm. contains a rat unit in 500 γ.

On reaction with propionic acid anhydride and further high vacuum distillation a physiologically highly active propionate is obtained therefrom.

Example 8

The procedure is the same as described in Example 6 with the exception that in the place of isoeugenol methyl ether 20 g. of vinyl anisol are used. The distillate obtained between 180°–210° C. at 0.001 mm. has an activity of 200 γ for 1 rat unit.

On acetylation and further high vacuum distillation a physiologically highly active acetate is obtained therefrom.

The terms "phenols containing an unsaturated side chain" as well as "propenyl phenols" as used in the specification and claims include all phenolic compounds which are substituted by an alkylene radical i. e. an aliphatic or alicyclic hydrocarbon radical having at least one double bond in their molecule.

Of course, many changes and variations may be made in the reaction conditions, the temperature employed, the concentration of the compounds, the isolation and the purification methods used and so forth in accordance with the principles set forth herein and in the claims annexed hereto.

What we claim is:

1. A method for making physiologically active compounds comprising subjecting a member of the class consisting of free and etherified phenols containing an unsaturated side chain to the action of an organo-metal compound in which the metal is directly joined to a carbon atom and isolating from the reaction mixture the oestrogenic product.

2. A method for making physiologically active compounds comprising subjecting a member of the class consisting of free and etherified propenyl phenols to the action of an organo-metal compound in which the metal is directly joined to a carbon atom, and isolating from the reaction mixture the oestrogenic product.

3. A method for making physiologically active compounds comprising subjecting p-propenyl-phenol to the action of an organo-metal compound in which the metal is directly joined to a carbon atom, and isolating from the reaction mixture the oestrogenic product.

4. A method according to claim 1 wherein a phenol containing an unsaturated side chain, in statu nascendi is used as starting material.

5. A method according to claim 1 wherein a phenol containing an unsaturated side chain, in statu nascendi as obtained on hydrolysis of its phenolic derivatives is used as starting material.

6. A method according to claim 1 wherein ethyl magnesium-iodide is used as a reaction component.

7. A method according to claim 1 wherein the oestrogenic compound is separated from the reaction mixture by fractional distillation.

8. A method according to claim 1 wherein the oestrogenic compounds are separated from the reaction mixture by fractional distillation in a high vacuum.

9. A method for making physiologically active compounds comprising esterifying compounds as may be obtained according to claim 1 to form a carboxylic ester, and separating from the esterification mixture the resulting esters.

10. A method for making physiologically active compounds comprising treating with acetylating agents a compound obtained according to claim 1 and separating the acetate ester from the acetylation mixture.

11. A method for making physiologically active compounds comprising esterifying a compound obtained according to claim 1, to form a carboxylic ester separating the ester from the esterification mixture and purifying the ester by fractional distillation in a high vacuum.

12. The estrogenic product produced by heating a hydroxybenzene having an unsaturated side chain of three carbon atoms in the presence of a Grignard reagent, followed by conversion into a carboxylic acid ester.

13. A method according to claim 1 wherein the reaction takes place in the presence of a Grignard reagent.

ARTHUR SERINI.
KONRAD STEINRUCK.